US011606911B2

(12) United States Patent
Mosman et al.

(10) Patent No.: US 11,606,911 B2
(45) Date of Patent: Mar. 21, 2023

(54) PLANT MATERIAL TRIMMING DEVICE

(71) Applicant: MOSMAN MACHINERY COMPANY, INC., Nevada City, CA (US)

(72) Inventors: Dana Eliot Mosman, Boulder, CO (US); Donald Mosman, Nevada City, CA (US); Angel Ramon Torrado Perez, Lakewood, CO (US)

(73) Assignee: ETEROS TECHNOLOGIES USA, INC., Surrey (CA)

( * ) Notice: Subject to any disclaimer, the term of this patent is extended or adjusted under 35 U.S.C. 154(b) by 972 days.

(21) Appl. No.: 16/365,117

(22) Filed: Mar. 26, 2019

(65) Prior Publication Data

US 2019/0297782 A1   Oct. 3, 2019

Related U.S. Application Data

(60) Provisional application No. 62/648,542, filed on Mar. 27, 2018.

(51) Int. Cl.
*A01G 3/00* (2006.01)
*A23N 15/08* (2006.01)

(52) U.S. Cl.
CPC .............. *A01G 3/002* (2013.01); *A23N 15/08* (2013.01)

(58) Field of Classification Search
CPC .......... B26D 7/0691; B26D 3/22; B26D 1/29; B26D 1/02; B26D 1/36; B26D 1/62; Y10T 83/6473; Y10T 83/6667; A23N 1/003; A23N 7/02; A23N 15/08; B02C 18/18; A01G 3/002; A01G 2003/005; A01G 3/00

See application file for complete search history.

(56) References Cited

U.S. PATENT DOCUMENTS

| 2,114,730 | A | | 4/1938 | Urschel |
| 2,393,461 | A | | 1/1946 | Finley |
| 3,010,498 | A | | 11/1958 | Carlson |
| 3,854,395 | A | * | 12/1974 | Hirahara .................. A23N 7/02 99/626 |
| 3,871,723 | A | | 3/1975 | Pray |

(Continued)

FOREIGN PATENT DOCUMENTS

EP           0004143 B1    9/1979

*Primary Examiner* — Jonathan G Riley
(74) *Attorney, Agent, or Firm* — Russell Manning, FisherBroyles, LLP

(57) ABSTRACT

The present disclosure is directed to an apparatus and related methods (i.e. utilities) for trimming plants, in particular, buds and flowers, to remove unwanted plant material. A typical application would be to process a plant to leave only trimmed buds and flowers for use in potpourri, fragrant sashes, or as a prelude to further processing of essential oils. The utilities enable faster and safer production of plant material than prior plant processing machines. The utilities employ a coaxial drum and cutting element that counter rotate. This coaxial cutting element typically includes a plurality of cutting elements, to create a plurality of cutting interface that shear unwanted plant material form plant material within the drum and then collect this debris though, for example, a vacuum system. The use of the counter-rotating cutting interfaces allows for multiplying the cutting interfaces over prior existing machines.

9 Claims, 17 Drawing Sheets

(56) References Cited

U.S. PATENT DOCUMENTS

| | | | |
|---|---|---|---|
| 3,964,715 A * | 6/1976 | Burgess, Jr. | A23N 7/02 99/585 |
| 4,023,477 A * | 5/1977 | Hirahara | A23N 7/02 99/585 |
| 4,043,036 A | 8/1977 | Stevens, Sr. | |
| 4,167,975 A | 9/1979 | Fahrenholz | |
| 4,206,671 A * | 6/1980 | Hoehn | B26D 3/22 83/410.8 |
| 4,391,172 A * | 7/1983 | Galland | B26D 1/03 83/403 |
| 4,604,925 A * | 8/1986 | Wisdom | B26D 7/0691 83/13 |
| 4,736,896 A | 4/1988 | Wagner | |
| 4,889,046 A * | 12/1989 | Cornelissen | A23N 15/08 99/546 |
| 7,028,844 B2 | 4/2006 | Nelson | |
| 7,121,071 B2 | 10/2006 | Berkeley | |
| 7,168,643 B2 | 1/2007 | Mercier | |
| 8,757,524 B2 * | 6/2014 | Mosman | A01G 3/00 241/74 |
| 9,380,805 B2 * | 7/2016 | Holcomb | A23N 15/12 |
| 2007/0069056 A1 * | 3/2007 | Shouse | A01G 3/00 241/277 |
| 2007/0095216 A1 | 5/2007 | Zittel et al. | |
| 2009/0191928 A1 * | 7/2009 | Snyder, Jr. | A23N 15/02 460/134 |
| 2012/0279193 A1 * | 11/2012 | Mosman | A01G 3/00 56/233 |
| 2013/0175372 A1 * | 7/2013 | Mosman | B02C 19/0056 241/230 |
| 2014/0030396 A1 * | 1/2014 | Bucks | B26D 1/40 83/13 |
| 2014/0087794 A1 * | 3/2014 | Hall | B26D 1/36 460/123 |
| 2014/0196587 A1 * | 7/2014 | Beyerlein | A01G 3/00 83/331 |
| 2015/0285427 A1 * | 10/2015 | Evans | F16M 1/00 83/859 |
| 2015/0290827 A1 * | 10/2015 | Evans | A01G 3/0435 83/698.11 |
| 2017/0164557 A1 * | 6/2017 | Harold | A01D 46/02 |
| 2019/0070741 A1 * | 3/2019 | Ingram | A01G 3/00 |
| 2019/0124851 A1 * | 5/2019 | Ingram | A01G 3/00 |
| 2019/0224687 A1 * | 7/2019 | Ingram | B02C 17/02 |
| 2019/0297782 A1 * | 10/2019 | Mosman | A01G 3/00 |
| 2019/0299218 A1 * | 10/2019 | Camaren | A01G 3/00 |

* cited by examiner

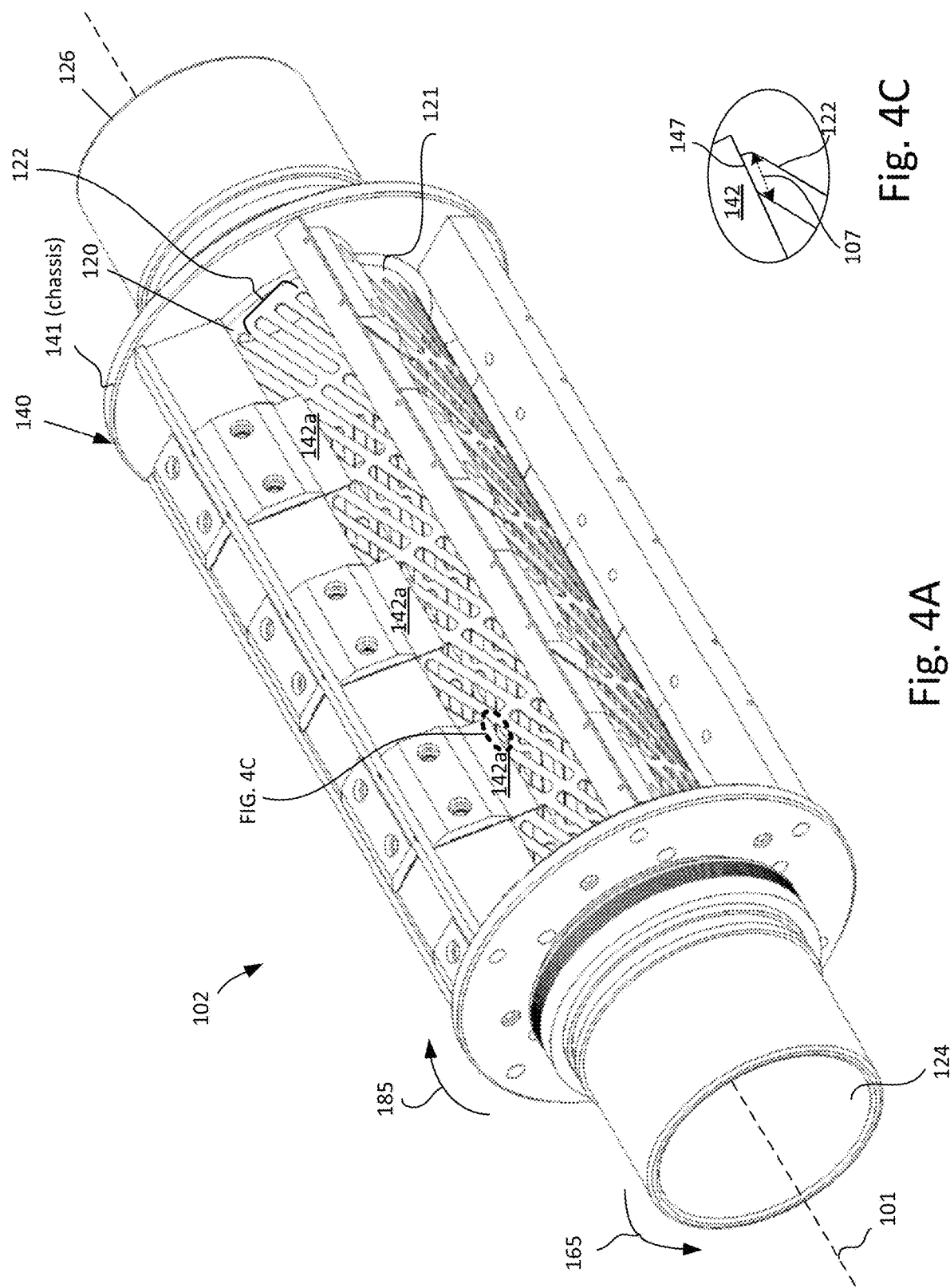

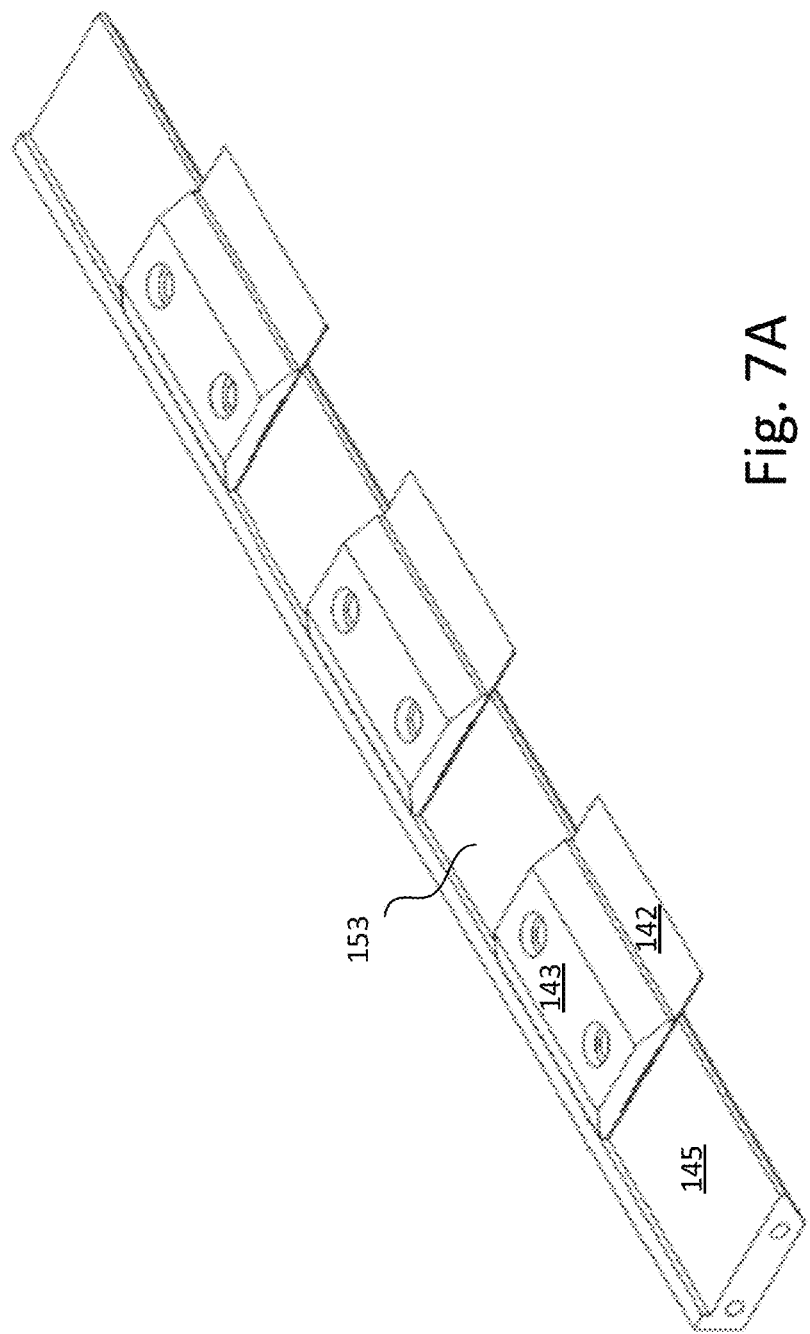

PLANT MATERIAL TRIMMING DEVICE

CROSS REFERENCE

The present application claims the benefit of the filing date of U.S. Provisional Application No. 62/648,542 having a filing date of Mar. 27, 2018, the entire contents of which is incorporated herein by reference.

FIELD OF THE INVENTION

The present disclosure relates to the trimming of plants. In particular, but not by way of limitation the present invention relates to the trimming of plant material such as flowers, buds and leaves of a plant.

BACKGROUND

Flowers, buds and leaves, etc. (commonly "plant material") harvested from stemmed plants are often used in oils, medicinal products, aromatherapy, cuisine, perfumes, dyes, toilet preparations, tinctures, distillation products (e.g., steam distillation of lavender oil), smoking products, and/or the like. Methods are known for cutting, chipping, trimming, and grinding plant materials for a variety of purposes such as those listed above. However, traditional methods tend to involve significant manual labor, such as hand trimming to produce the desired end product and/or prepare the plant material for further processing.

One type of machine for trimming plant material utilizes a perforated rotating drum (e.g., cylindrical drum) to tumble plant material. Directly adjacent to the drum, usually below, is a cutting blade, which cuts plant material that extends through the perforations/apertures as the drum is rotating. In some drum-type trimming machines, a suction force is provided assist in extending plant material through the apertures. How much the plant material is trimmed is based on inter alia the size of the apertures, speed the drum is rotated, thickness of the drum, amount of suction force and proximity of the trimming blade to the outside of the drum. In this regard, the quality of the trim is highly dependent on the tolerances of the aforementioned aspects of a tumbling device. That is, a high quality trim can be produced by minimizing the tolerances of, for example, the proximity of the blade to the outside of the drum. However, these tighter tolerances can significantly increase the cost of a machine.

Additionally, many drum trimming machines utilize a single blade (e.g., cylindrical/helical blade similar to a push mower blade) placed adjacent to the drum. The drum can be driven by a first motor and rotation of the cylindrical/helical blade can be driven by a second motor. In such an arrangement, the cylindrical/helical blade and cylindrical drum interface along a single tangent line where the outer diameter of the two cylinders intersect. This creates a limited area for trimming of plant material within the drum. Further, the rotary motion of the drum tends to randomly move plant material within the drum up the inside surface of the drum until gravity causes it to fall back down toward the bottom of the drum and the tangent line trimming surface. Thus, the majority of the time plant material is in the drum, it is being tumbled but is not being trimmed by the blade. As a result, the trimming efficiency of this configuration is low leading to significantly longer trimming time and less throughput than is desired.

The long processing times of plant material in typical drum devices lead to further inefficiencies. For example, the limited cutting area tends to create localized accumulation of resin, sap, oils and/or other plant matter, clogging or gumming up portions of the machine. This can decrease the efficiency of the cutting device, even resulting in portions of the blade and drum becoming completely ineffective at trimming plant material. Therefore, machines need to be frequently stopped for cleaning and/or maintenance, further leading to less throughput. These inefficiencies of current machines result in larger processing costs and longer processing times than is desirable.

SUMMARY

Aspects of the presented disclosure are directed to a plant processing apparatus that cuts/shears undesirable plant material (e.g., leaves, flowers, seeds, calyxs, pistils, trichomes etc.) from a desirable portion (e.g., bud) of a plant. One aspect is directed to a rotary trimming device including an annular (e.g., hollow) central cylindrical drum (i.e., through which plant matter passes) and a co-axial cylindrical rotary shearing mechanism. In one arrangement, the cylindrical drum and the cylindrical shearing mechanism counter-rotate. The cylindrical central drum includes first and second ends and an annular sidewall extending, along a longitudinal axis (e.g., central axis), between the first and second ends. The sidewall has a plurality of perforations or slots extending between an inner surface and an outer surface. The rotary shearing mechanism includes a plurality of cutting elements (e.g., blades, taut wires, etc.) disposed around and extending along at least a portion of an outer surface of the central drum. At least a first cutting element is disposed at a first radial orientation relative to a longitudinal axis of the drum and at least a second cutting element is disposed at a second radial orientation to the longitudinal axis. The first and second cutting elements maintain a fixed relative orientation while the rotary shearing mechanism rotates. The rotary trimming device further includes a drum drive interconnected with the central drum. The drum drive is configured to rotate the central drum about its longitudinal axis. The rotary trimming device also includes a shearing drive interconnected with the rotary shearing mechanism. The shearing drive is configured to rotate the plurality of cutting element about the longitudinal axis.

Aspects also include a cutting elements where blades have a first end that contacts the outer surface of the drum. Further, the blades can be disposed to contact the outer surface of the drum such that at least a portion of each blade is maintained in an elastically deformed state causing the first end of the blade to exert a force against the outer surface of the central drum.

Aspects include at least a portion of the plurality of slots having a length extending along a major axis and a width extending across a minor access, where the major axis is disposed in a non-parallel orientation relative to the longitudinal axis. Each cutting can be longer than a longitudinal length of at least a portion or the entirety of the plurality of slots. In some aspects, the plurality of slots are arranged in multiple columns along the longitudinal axis, where the multiple columns are separated by a series of solid sections or tracks on the outer surface of the sidewall of the drum. That is, each of the tracks can define a solid circumferential wall section and a width of each cutting element extends between at least a first track and at least a second track. Aspects also include the plurality of slots forming a regular repeating pattern in the wall of the drum.

Aspects include the rotary shearing mechanism having at least first and second sets of cutting elements each extending along the longitudinal axis. Aspects further include the plurality of cutting element comprising wires extending from the first end to the second end of the central drum.

Aspects include the drum drive rotating the central drum in a first direction and the shearing drive rotating the rotary shearing mechanism in a second direction. In some aspect the drum drive is operable to rotate the central drum at a first speed and the shearing drive is operable to rotate the rotary shearing mechanism at a second speed that is independent of the first speed.

Aspects further include a plurality of cutting elements that are replaceable.

BRIEF DESCRIPTION OF THE DRAWINGS

FIG. 4A illustrates a perspective view of one embodiment of the rotary trimming device.

FIG. 4C illustrates a magnified detailed view of the intersection of one embodiment of blades and slots shown in FIGS. 4A and 4B.

FIG. 5C illustrates a magnified detailed view of one embodiment of the slots illustrated in FIG. 5B.

FIG. 7A illustrates a perspective view of one embodiment of a blade chassis and blades of the rotary shearing mechanism.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

Figure 1:
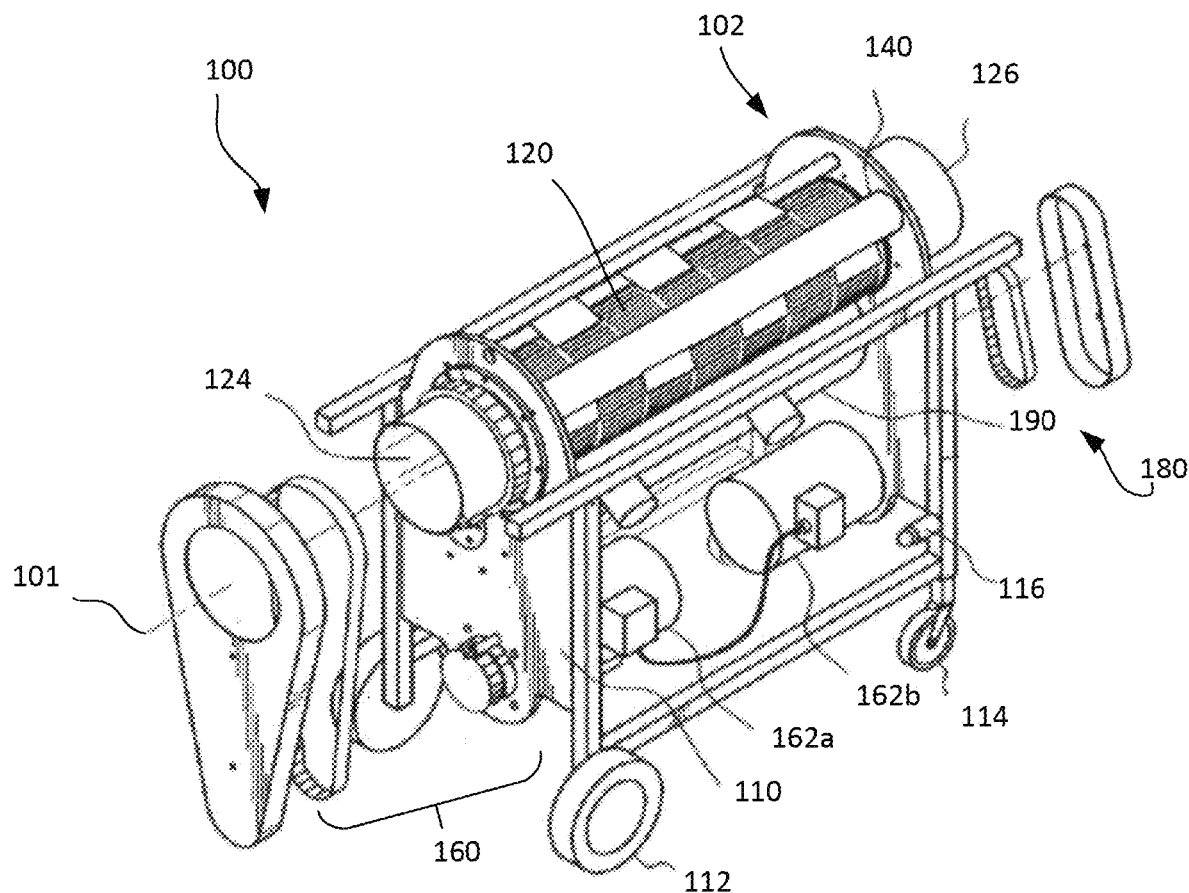
FIG. 1 is an isometric, perspective partially exploded view of embodiments of the plant processing apparatus.

The presented apparatus or machine is directed to trimming plant material (e.g., flowers, leaves, etc.) from the bud of a plant. FIG. 1 illustrates a perspective view of plant processing apparatus 100 including major components of rotary trimming device 102, drum drive 160 and shearing drive 180. The rotary trimming device 102 further includes central drum 120 and rotary shearing mechanism 140 axially disposed around the central drum 120. The trimming device 102, drum drive 160, and shearing drive 180 can be located on stand 110. The stand 110 can also have wheels 112, 114 to facilitate movement of processing apparatus 100.

Figure 2A:
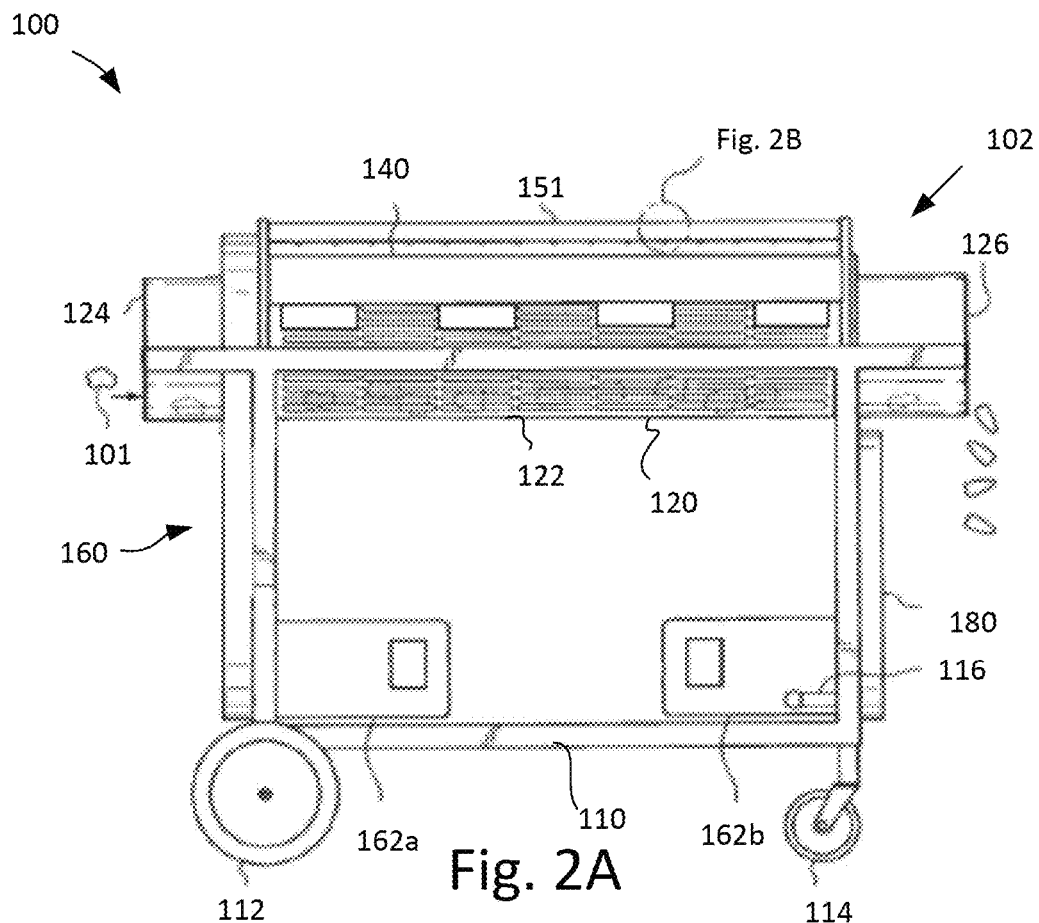
FIG. 2A is a side view of one embodiment of the plant processing apparatus illustrating the processing of plant material through the trimming device.

FIG. 2A illustrates embodiments of processing plant material, such as plant buds (hereafter 'bud'), through processing apparatus 100. In operation, the generally cylindrical central drum 120 is rotated about its longitudinal axis 101 by drum drive 160, and the co-axial rotary shearing mechanism 140 is rotated in an opposite direction (e.g., counter-rotated) to central drum 120 by shearing drive 180. A bud 104 containing plant material is fed into front end (entrance sleeve) 124, whereby operation of the processing apparatus 100 causes the bud 104 to migrate into central drum 120. Inside central drum 120, undesirable portions of the bud 104 (e.g., leaves) can project through slots 122 (see FIG. 4A) in central drum 120 where it is trimmed/cut from the bud 104 by the counter-rotation between central drum 120 and rotary shearing mechanism 140. After passing through central drum 120, trimmed buds 104 exit the processing apparatus 100 from the back end (exit) 126.

As illustrated in FIGS. 1 and 2A, embodiments of processing apparatus can include stand 110 having height adjustment apparatus 116. In some embodiments height adjustment apparatus 116 is mounted to wheels 114 located on the back end of the processing apparatus 100. The height adjustment apparatus 116 can raise or lower the back end. For example, when processing buds of a plant, lowering the back end of processing apparatus 100 creates a downward slope between entrance 124 and exit 126. In this regard, gravity will help to move buds located in central drum 120 from the entrance 124 to exit 126. In some embodiments height adjustment apparatus 116 can be used to increase or decrease the downward slope to increase or decrease the rate at which buds travel through central drum 120. In some embodiments, height adjustment apparatus 116 can be used to maintain central drum 120 in a substantially horizontal position. In these embodiments, rotational movement of central drum 120 can be used to cause migration of plant buds from entrance 124 to exit 126.

The example of stand 110 as depicted in FIG. 1 shows a frame made from square metal stock with a fixed height and larger wheels on one end and smaller wheels with a height adjustment mechanism on the other end. However, one skilled in the art would appreciate that the frame 7 can be made from rectangular or tubular stock of different metals, plastics and/or carbon composition material, and further, that differently sized wheels and a different height adjustment mechanism 116 for lowering the frame on one end can be used.

Embodiments of processing apparatus also include electric motors 162a, 162b for driving drum drive 160 and shear drive 180, respectively. In this regard, a first electric motor 162a can be coupled to central drum 120 and second electric motor can be coupled to rotary shearing mechanism 140. Embodiments, of the coupling mechanism are described in greater detail in relation to FIGS. 3A-B below. The speed of the first electric motor 162a can be controlled independently of the speed of the second electric motor 162b. In this regard, drum drive 120 can be rotated at a first speed, which may be chosen to facilitate trimming of plant buds within central drum 120. When the plant buds are rotated within central drum 120, they are typically carried, in the direction of rotation, up the inside wall of central drum 120. That is, based on inter alia friction, speed of rotation, size of the drum, size of the plant buds, the plant buds are carried up the inside surface to various degrees until they fall back down toward the bottom of the central drum 120. The speed of central drum 120, through control of first electric motor 162a, can be adjusted to facilities extension of undesirable plant material (attached to plant buds) within slots 122 on drum drive 120. In this regard, rotational speed of drum drive 120 may control inter alia the speed at which plant material is trimmed from plant buds, the amount (e.g., closeness) of plant material removed from buds, and/or the amount of plant buds that can be trimmed by plant processing apparatus in a given time.

The speed and direction of second electric motor 162b can also be independently controlled. For example, it may be desirable to drive rotary shearing mechanism 140 at a faster speed than central drum 120. In this regard, the speed of second electric motor 162b can be independently controlled to drive rotary shearing mechanism 140. Embodiments of the processing apparatus 100 include increasing or decreasing the rotational speed of rotary shearing mechanism 140 to control how plant buds are trimmed. For example, increasing the rotational speed of shearing mechanism 140 can increase the rate at which plant buds are trimmed, thereby increasing processing throughput.

Embodiments of processing apparatus 100 include a vacuum manifold 190 (See, e.g., FIG. 1), which can be connected to a vacuum system (not shown) to remove cut plant material (e.g., plant debris). In this regard, vacuum manifold can cover a lower portion of the rotary trimming device 102 and a hood or shield (not shown) can cover an upper portion of the rotary trimming device 102. In this regard, the entirety of the rotary trimming device 102 including the central drum 120 and co-axial rotary shearing mechanism 140 may be fully encased within a manifold (e.g., vacuum or pressure) to improve airflow and/or localization of negative or positive air pressures within the machine. As buds are trimmed, trimmed plant material can be captured within a low pressure region and/or sucked into a vacuum system through vacuum manifold 190. In some embodiments, creating a low pressure vacuum in the area around vacuum manifold 190 can also act to pull more plant material through slots 122, thereby leading to more a great amount of plant material being trimmed from the buds (e.g., the buds are trimmed to a smaller size). In this regard, the combination of inter alia the rotational speed of the central drum 120, the rotational speed of the rotary shearing mechanism 140 and the vacuum system can all be independently controlled to affect how a plant bud is trimmed (e.g., the amount of material removed, speed of processing, etc.). In some embodiments, pressurized air could be used in addition to or as a substitute for the vacuum system, for example, to remove trimmed plant material.

Figure 2B:
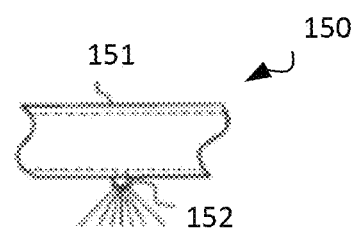
FIG. 2B is a magnified detailed view of one embodiment of a liquid sprayer shown in FIG. 2A.

Turning to FIG. 2A and 2B, embodiments of processing apparatus include a liquid sprayer system 150. Liquid sprayer system 150 includes a supply line 151 and sprayer nozzle 152 that operate to spray liquid on central drum 120 and rotary shearing mechanism 140 during trimming operations. Liquid, such as water, can be sprayed to help keep the trimming device 102 from accumulating plant debris, oils, saps, resins, etc. In some embodiments, liquid can be sprayed on trimming device 102 to lubricate cutting components such as central drum 120 and blades of the rotary shearing mechanism 140, and/or facilitate tumbling/movement/trimming of plant buds within central drum 120. In some embodiments, it is contemplated that the liquid sprayer system 150 may be coupled to a different location on processing apparatus 100, than is seen in FIG. 2. For example, a plurality of sprayer nozzles 152 may be located rotationally about central drum 150. In further arrangement (not shown), the sprayer nozzles could be incorporated into the rotary shearing mechanism 140. In such an arrangement, the nozzles could spray liquid directly onto the blades while the blades and nozzles rotate. Such an arrangement would incorporate a rotary fluid manifold associated with the rotary shearing mechanism.

Figure 3A:
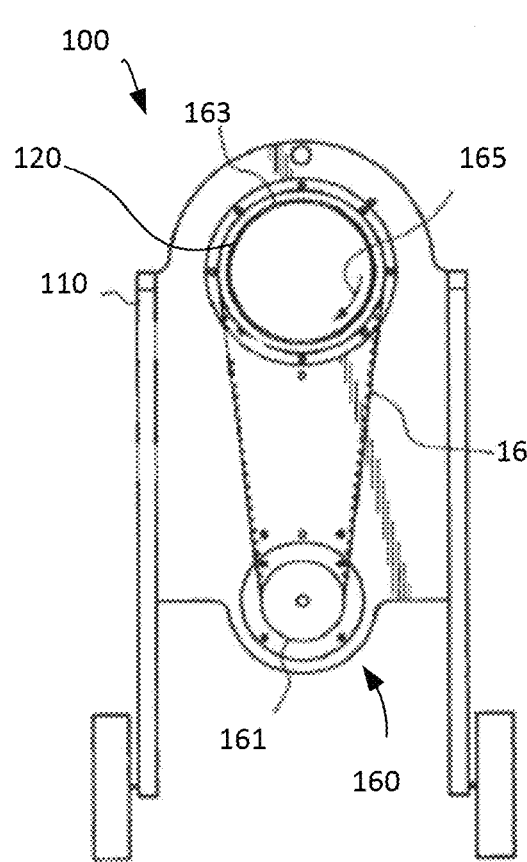
FIGS. 3A and 3B are front and end views, of embodiments of the plant processing apparatus.
Figure 3B:
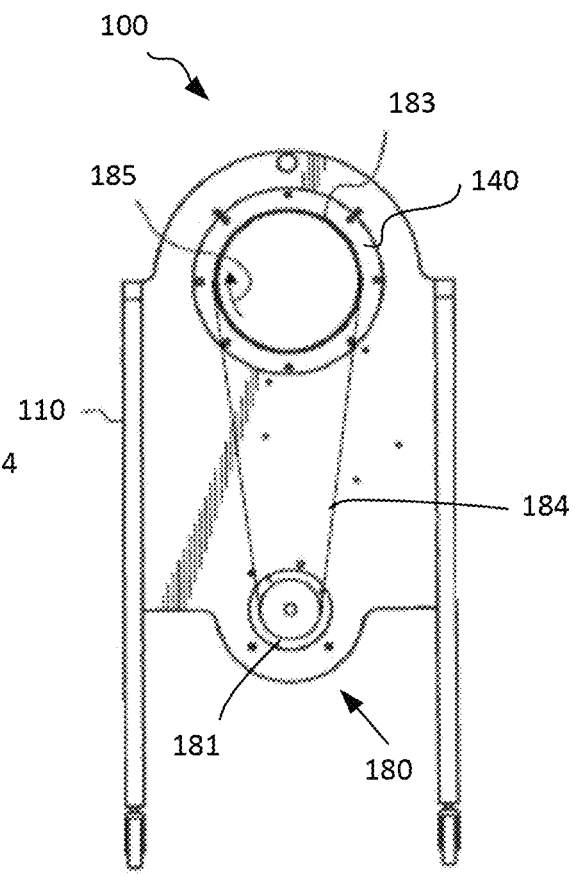

FIGS. 3A and 3B illustrate end views of embodiments of processing apparatus 100. FIG. 3A illustrates entrance 124 end including drum drive 160. Drum drive 160 includes motor coupling 161 (e.g., pulley, gear, sprocket and/or the like), drive belt 164, and drum coupling 163. FIG. 3B illustrates exit 126 end including shear drive 180. Shear drive 180 includes power coupling 181 (e.g., pulley, gear, sprocket and/or the like), shear belt 184 and shear coupling 183. In both embodiments, electric motors 162a, 162b drive motor coupling 161 and power coupling 181, respectively. With respect to drum drive 160, motor coupling 161 rotates drive belt 164 which interfaces with drum coupling 163 to rotate central drum 120. In this regard, drum coupling can be rigidly attached to central drum 120. Sizes/ratios of the motor coupling 161 to the drum coupling 163 can be varied to achieve efficient motor operation in the range of rotational speed that central drum 120 will typically operate. For example, if central drum 120 is intended to rotate at about 20-80 revolutions per minute, the ratio between the rotational rates of motor coupling 161 and drum coupling can be chosen to match torque, rotational speed, power characteristics and/or the like of electric motor 162a. Shear drive 180 operates, independently of drum drive 160, but substantially in the same way. However, rotational ratios of shear drive 180 may be chosen based on the intended rotational speeds of shearing mechanism 140. In some embodiments, a single electric motor 162 can be used to drive both central drum 120 and shearing mechanism 140. In this regard, gears, pulleys, sprockets, and/or the like can be used to turn central drum 120 and shearing mechanism 140 at different speeds. In some embodiments, drum drive 160 and shear drive 180 can use gears to transfer power from motor(s) 162 to the respective drive.

In the present embodiment, drum drive 160 and shear drive 180 are configured to counter-rotate central drum 120 and shearing mechanism 140. For example, turning to FIG. 3A, drum drive 160 rotates central drum 120 in a first angular direction 165. As illustrated in FIG. 3B, shear drive 180 rotates shearing mechanism 140 in a second angular direction 185. In this regard, central drum 120 is counter-rotated with respect to shearing mechanism 140. However, in some embodiment, these components may rotate in a common direction though at differing speeds.

Figure 4B:
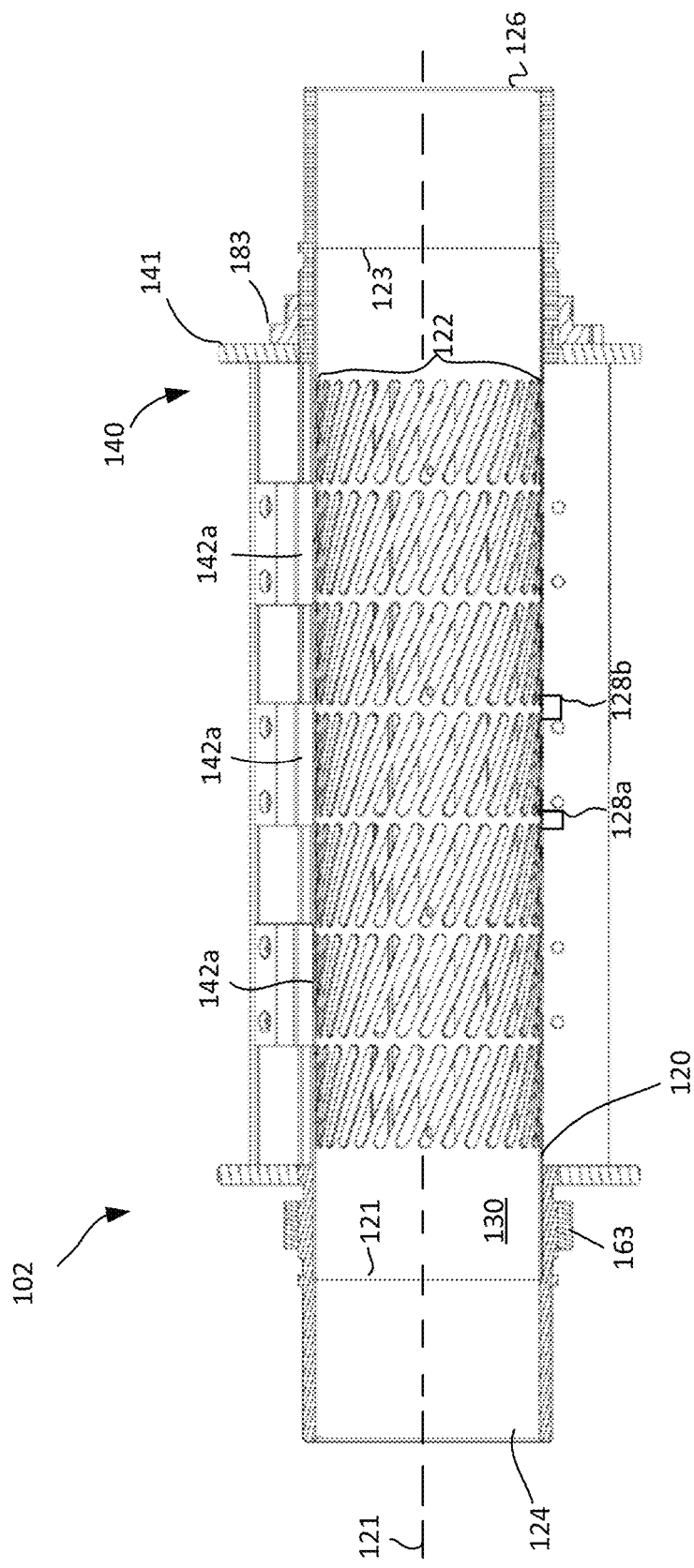
FIG. 4B illustrates a side, partial cut-away view taken at a cross section passing through the longitudinal axis of embodiments of the rotary trimming device.

FIGS. 4A and 4B illustrates perspective and side views, respectively, of embodiments of rotary trimming device 102. The central drum 120 extends along longitudinal axis 101 from a first end 121 to a second 123 forming a hollow cylindrical structure. Central drum 120 has slots 122 that extend from an inner surface to an outer surface 130 of central drum 120. That is, the slots 122 form perforations or apertures within the wall of central drum 120. Central drum 120 is rotably connected to the entrance sleeve 124 and exit sleeve 126. In some embodiments central drum 120 can be mechanically attached to the entrance sleeve 124 and exit sleeve 126, using, for example, various bearing or bushings In the illustrated embodiment, entrance sleeve 124 is rotably connected to a first section of central drum 120 including first end 121. Drum coupling 163 is coupled with the outer surface of entrance sleeve 124. In this regard, central drum 120 can rotate about longitudinal axis in a first direction 165 when driven by drum drive 160.

Rotary shearing mechanism 140 is co-axially disposed around the outer surface 130 of drum drive 120 and configured to rotate about its longitudinal axis 101. The rotary shearing mechanism 140 includes a chassis 141 for supporting the plurality of blades 142 that are disposed around the outer surface 130 of the central drum 120 (e.g., at different radial or angular positions relative to the longitudinal axis of the central drum). The chassis 141 is coupled to shear coupling 183 such that shear drive 180 can independently rotate rotary shearing mechanism 140 about central drum 120. In various embodiments, chassis 141 is configured to dispose at least a portion of the blades against the outer surface 130 of the central drum 120. In operation, rotary shearing mechanism 140 can be rotated in second direction 185, which is opposite of first direction (i.e., counter-rotated). When central drum 120 and rotary shearing mechanism 140 are counter-rotated, a cutting edge (e.g., first edge 147 shown in FIG. 7 B-C) travels along the surface of central drum 120 in the second direction 185, while the central drum is rotating in first direction 165. In operation plant material that extends through slots 122 is sheared from its plant bud by the rotating blades 142.

Notably, each blade moves in a continuous path around the outer surface 130 of central drum 120. Further, the plurality of blades 142 can be disposed by chassis 141, in a configuration such that each slot 122 has at least a portion of one blade 142 that passes over it. As a result, the plurality of blades 142 can shear plant material over a significantly larger radial surface of the central drum as compared to devices with a fixed helical blade that only interfaces with a drum along a single tangent line. Further, the ability to rotate rotary shearing mechanism 140 independently and at greater speeds than central drum 120, results in the plurality of blades 142 passing over slots 120 more often. In contrast, with traditional fixed helical blades, each slot only passes the blade once per rotation of the drum. Therefore, with traditional cutting drums the only way to get more blade passes per time is to increase the rotation rate of the drum, which may result in poor trimming quality of plant buds. However, with co-axial counter-rotation of the shearing mechanism 140 and central drum 120, plants bud can be trimmed along a larger portion of the outer surface 130 of the central drum 120.

Embodiments include the plurality of slots 122 disposed in a repeating pattern on central drum 120. For example, the plurality of slots can be disposed in multiple columns extending along longitudinal axis 101. Each column of slots is disposed radially (e.g., around the circumference) about central drum 120. In this regard, solid portions or tracks 128 of the central drum extend radially around the central drum 120 between the multiple columns of slots 122. In various embodiments each blade 142 of the plurality of blades extends across a width of a column of slots 122. For example, a first side of blade 142 is disposed on a first track 128a and a second side of blade 142 is disposed on a second track 128b. In this regard, the width of each blade 142 extends across at least one entire slot 122. Further, disposing the ends of blades 142 on tracks 128 can facilitate trimming of plant buds. That is, blades 142 can be disposed to contact the outer surface 130 of central drum 120, to increase shearing action of the blades 142 and slots 122. In some embodiments, the cutting edge (e.g., first edge 147 shown in FIG. 7 B-C) can be biased against the outer surface 130 of central drum 120. For example, the chassis 141 can dispose the blades 142, such that each blade 142 is maintained in an elastically deformed state against the outer surface 130 of central drum 120, thereby exerting a force against central drum 120. Though illustrated as having blades that extend over a single column of slots, it will be appreciated that the blades may extend over the entire length of the central drum 120. The illustrated embodiment of the blades is presented by way of example and not by way of limitation.

Figure 5A:
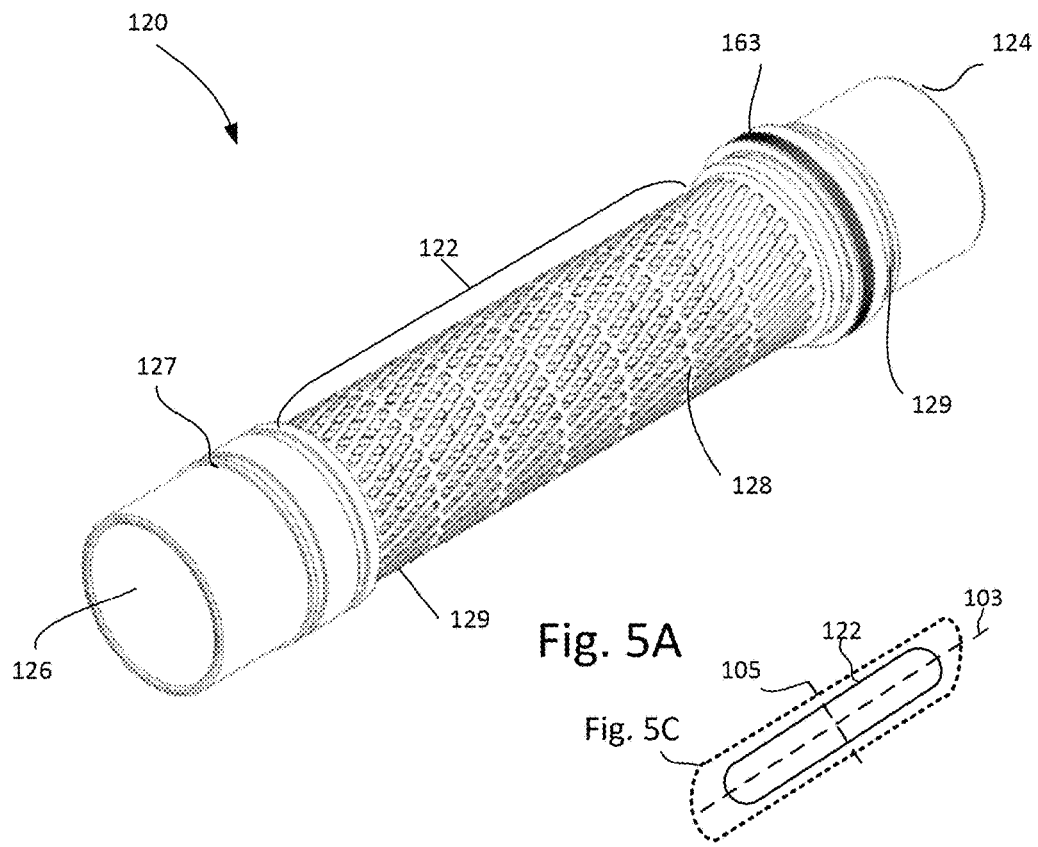
FIGS. 5A and 5B illustrate perspective and side views, respectively, of one embodiment of the central drum of the rotary trimming device.
Figure 5B:
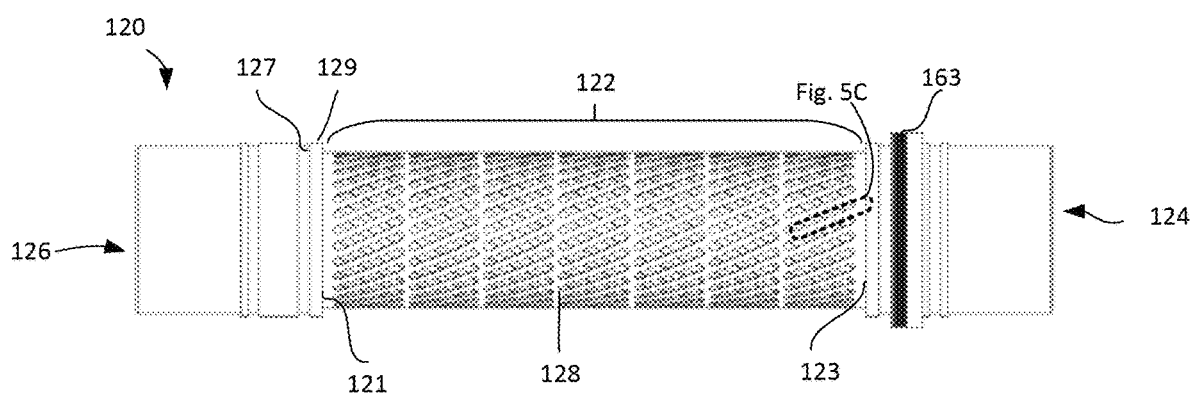

FIGS. 5A and 5B illustrate perspective and side views, respectively, of embodiments of central drum 120. As illustrated, the slots 122 can be disposed in columns extending along longitudinal axis 101. Each slot 122 slot is disposed in a non-parallel relationship to longitudinal axis 101. Turning to FIG. 5C, each slot has a length that extends along major axis 103 and a width that extends across minor axis 105. Major axis 103 of each slots is disposed at a non-zero angle relative to longitudinal axis 101 (e.g., major axis 103 is non-parallel to longitudinal axis 101). However, this is not a requirement. In this regard, slots 122 can be said to extend angularly on central drum 120. Disposing slots 122 at angularly around central drum 120 may help to prevent blades 142 from colliding with and/or becoming trapped in within slots 122 during operation. For example, in operation blades 142 are rotated over slots 122. In embodiments where blades 142 are biased against the outer surface 130 of central drum 120, as each blade 142 passes over a slot 122 it will tend to want to push down/move into the open area of the slot. If unsupported, each blade 142 could collide with or jam with the edges of various slots 122, which could result in jamming/breaking of processing apparatus 100. As illustrated in FIGS. 4 A-B, each blade 142 is wider than a longitudinal length (i.e., length the slot extends in longitudinal direction) of corresponding slots 122 that it passes over. As such, each blade 142 is supported on each side of slots 122 by tracks 128.

It should be noted that different columns of slots 122 could have different lengths and, therefore, blades 142 corresponding to those columns would have different widths also. In some embodiments, each blade 142 can extend across multiple columns of slots 122 and/or all the columns of slots 122. One skilled in the art would appreciate that similar slotted drums with a different number of slots per horizontal row and/or with slots of different widths and lengths and/or a drum of a different thickness could be used.

In various embodiments, cutting edge of blades 142 are parallel to longitudinal axis 101, and slots 122 are angularly disposed with respect to longitudinal axis 101 as discussed above. Therefore, as illustrated in FIG. 4C, the first edge 147 of each blade 142 will cross each slot 122 at an angle. In effect, first edge 147 spans an angular width 107 of slot 122. This has multiple effects on operation of rotary trimming device 102 and trimming of plant buds. For example, blades can be biased and/or disposed directly against the surface of central drum 120 and pass over slots 122 without colliding/moving into the slot 122 and jamming and/or breaking processing apparatus 100. Further, disposing first edge 147 in direct contact with the outside surface of central drum 120 increase the shearing force on plant buds/material due to the direct contact between these components. Additionally, because blades 142 can be biased against central drum 120, as they wear the elastic/spring force will continue to press each blade 142 against central drum 122 maintaining the shearing force on plant buds/material. This allows the blades to be self-sharpening. Further, this can lead to extended service life of blades, reduced maintenance, greater processing throughput, etc. Moreover, the angular orientation (e.g., non-parallel) of cutting edge 147 to slot 122 results in a "scissor" effect such that plant buds/material are sheared in a down and across action, which can lead more precisely trimmed plant buds.

Figure 6A:
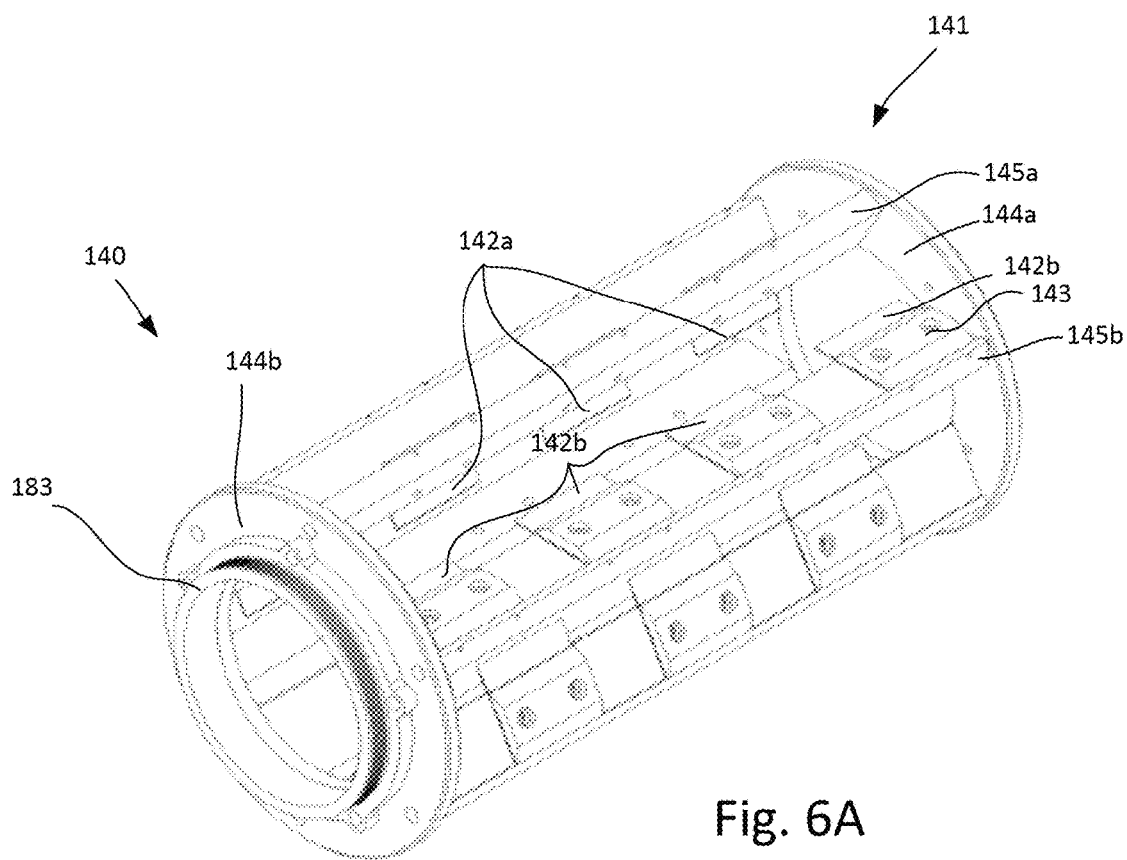
FIG. 6A and 6B illustrate perspective and side views, respectively, of one embodiment of the rotary shearing mechanism of the rotary trimming device.
Figure 6B:
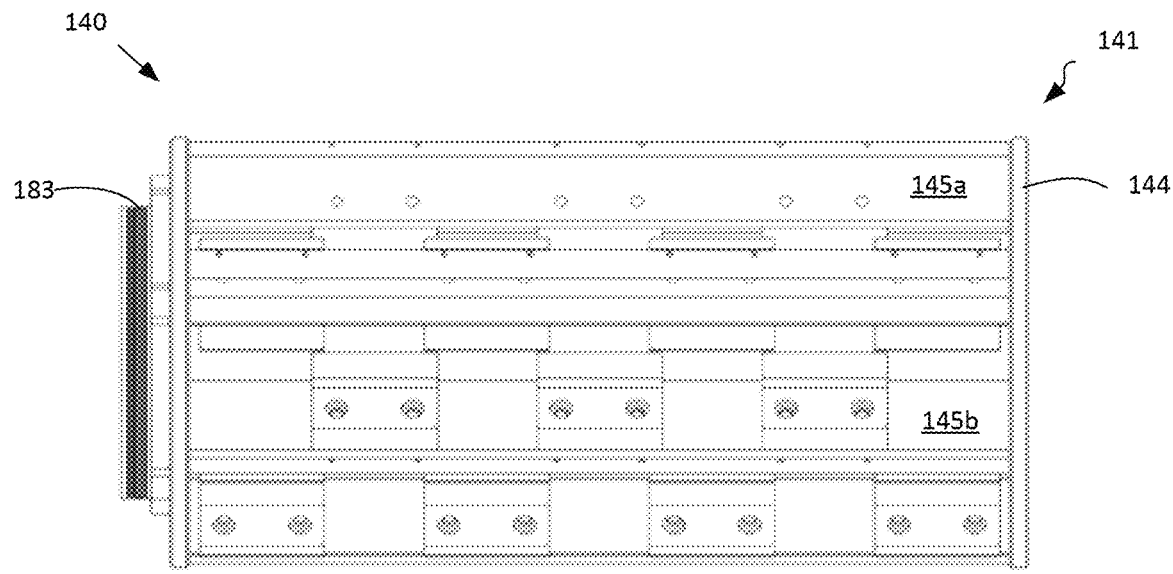

FIGS. 6A and 6B illustrate perspective and side views, respectively, of embodiments of rotary shearing mechanism 140. Rotary shearing mechanism 140 can include chassis 141, blades 142, blade mounts 143, annular end supports 144, and struts 145. The struts 145 extend between annular end supports 144 at different angular or radial positions about the annular end supports. The end supports 144 rotably couple to the outer surface 130 of central drum 120 and/or entrance 124/exit 126. In this regard, the annular end supports 144 rotably couple chassis 141 relative to central drum 120, thereby allowing rotational movement between these components. In some embodiments, annular end supports 141 can include bearings, bushings, ground surfaces, coatings and/or the like to facilitate rotational movement between central drum 120 and chassis 141, while otherwise fixing these components in a relative orientation. In various embodiments, the rotational coupling mechanism between central drum 120 and chassis 141 can allow these components to be separated, for example, to service and/or clean these components.

As noted, struts 145 extend between the first annular end support 144a and the second annular end support 144b. Blades 142 are coupled to struts by blade mounts 143. Blade mounts 143 removably attach to struts 145, for example through the use of one or more fasteners (e.g., screw, bolt, adhesive, tabs, magnets, and/or the like). In this regard, blade mounts 143 removably attach blades 142 to struts 145. For example, in the illustrated embodiment, blades 142 are formed from flat rectangular pieces of material (e.g., steel). Blade mounts 143 clamp blades 142 to struts 145 through the use of threaded fasteners, thereby fixing blades in a relative orientation to chassis 141 and central drum 120. Struts 145 can be disposed to position blades 142 at various orientations relative to central drum 120. For example, as illustrated, struts 145 are disposed at an angular orientation such that blades 142 approach central drum 120 at a relative angle. That is, the blades are neither parallel nor orthogonal to the outer surface 130 of central drum 120.

In various embodiments, struts 145, can each support multiple blades 142. In some embodiments, chassis 141 supports multiple struts 145 disposed around longitudinal axis 101. In various embodiments, multiple struts 145 are equally spaced (e.g., equal angular distance from each other) around the circumference of the end supports of the chassis 141. Such a configuration may lead to increased balancing of chassis 141 as it rotates around central drum 120, thereby decreasing any vibration associated with the operation of processing apparatus 100. In various embodiments a first strut 145a will support a first portion 142a of the plurality of blades 142 and a second strut 142b will support a second portion 142b of the plurality of blades 142. In some embodiments, the first portion 142a will partially overlap (e.g., along the longitudinal axis) with the second portion 142b. For example, as illustrated in FIGS. 4A and 4B, the first portion of blades 142a spans every other row of slots 122, with sides of the blades disposed on tracks 128. A second portion of blades 142b is offset with respect to first portion 142a, and spans a different set of every other row of slots 122. In this regard, the combination of the first portion 142a of blades on first strut 145a and second portion 142b of blades on second strut 145b spans each row of slots 122 disposed on central drum 120. This configuration is presented as an example, and it should be noted that many different combinations of strut 145 and blade 142 configurations are possible.

Figure 7B:
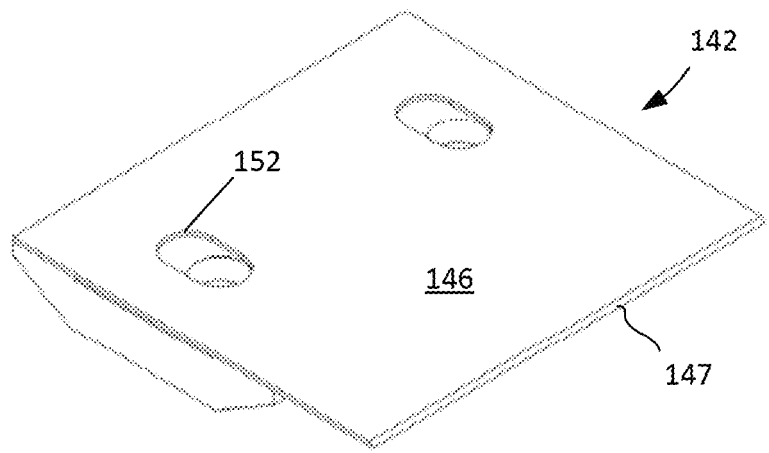
FIGS. 7B and 7C illustrate a top perspective and bottom perspective views, respectively, of embodiments of the blades of the rotary trimming device.
Figure 7C:
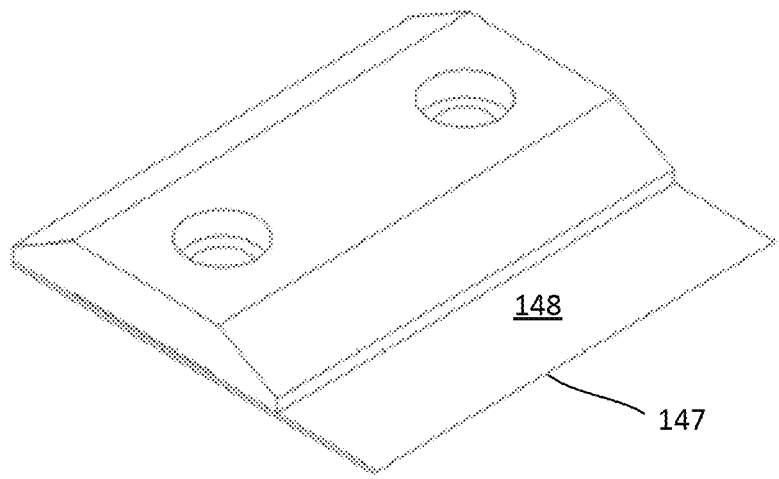

FIGS. 7A, 7B and 7C illustrate perspective views of one embodiments of struts 145, blade mounts 143 and blades 142. Turning first to FIG. 7A, blades 142 are removably mounted to strut 145 through blade mounts 143. In this embodiment, blade mounts 143 threadably engage strut to compress blades 142 against strut 145. Threaded fasteners such as screws can be used to fasten blade mounts 143 and blades 142 to struts 145. In this regard, the threaded fasteners can align with apertures 152 in blades 142 to orient blades 142 in relation to struts 145. In some embodiments struts 145 can include tab 153 to orient blades and/or blade mounts 143 in relation to struts 145.

FIG. 7B illustrates a bottom side of blade 142 and blade mount 143. Blade 142 can include a beveled and/or sharpened first edge 147 (e.g., cutting edge). In this regard blade 142 can be formed from material such as spring steel and be sufficiently flexible to be elastically deformed when biased against central drum 120. More specifically, first edge 147 contacts the outside surface of central drum 147. Biasing blade 142 toward central drum can result in first edge 147 being pressed against the outer surface 130 of central drum 120 such that blade 142 is flexed/elastically deformed. In this regard, first edge 147 will act as a spring pressing against central drum 120, thereby maintaining contact of blade 142 with central drum 120.

In various embodiments blades 142 can encompass a variety of configurations. For example, blades can be made from spring steel. This may facilitate blades 143 being biased against outer surface 130 of central drum 120. In some embodiments, blades 142 can have a curved profile that matches the cylindrical shape of central drum 120. In yet other embodiments, blades 142 can be serrated. In yet other embodiments, for example, 143 can extend from first end support 144a to second end support 144b. In some embodiments a combination of different blades could be used. For example, some struts 145 could be replaced with wire cutting elements. As will be appreciated by those skilled in art, numerous other blade and slot configurations are possible.

Figure 8A:
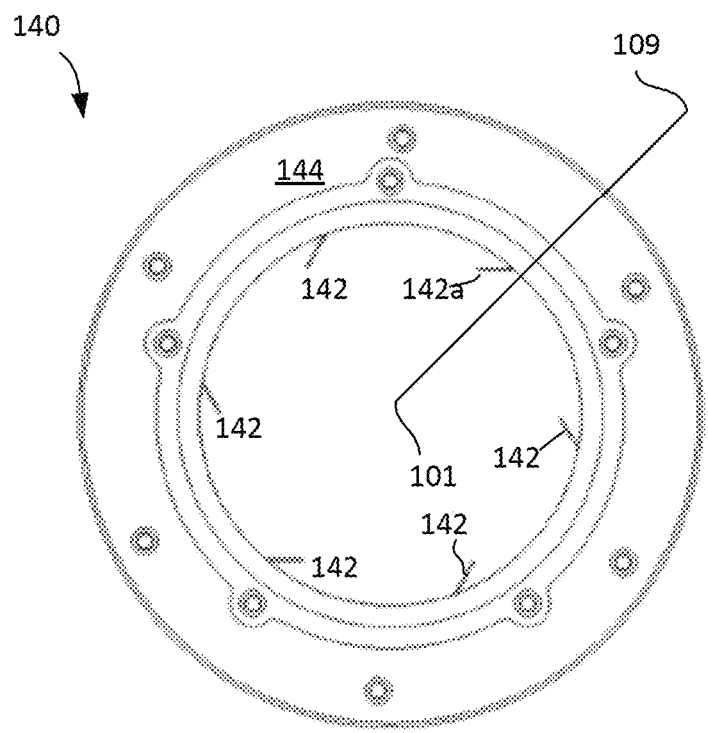
FIG. 8A illustrates an end view of one embodiment of the rotary shearing mechanism.
Figure 8B:
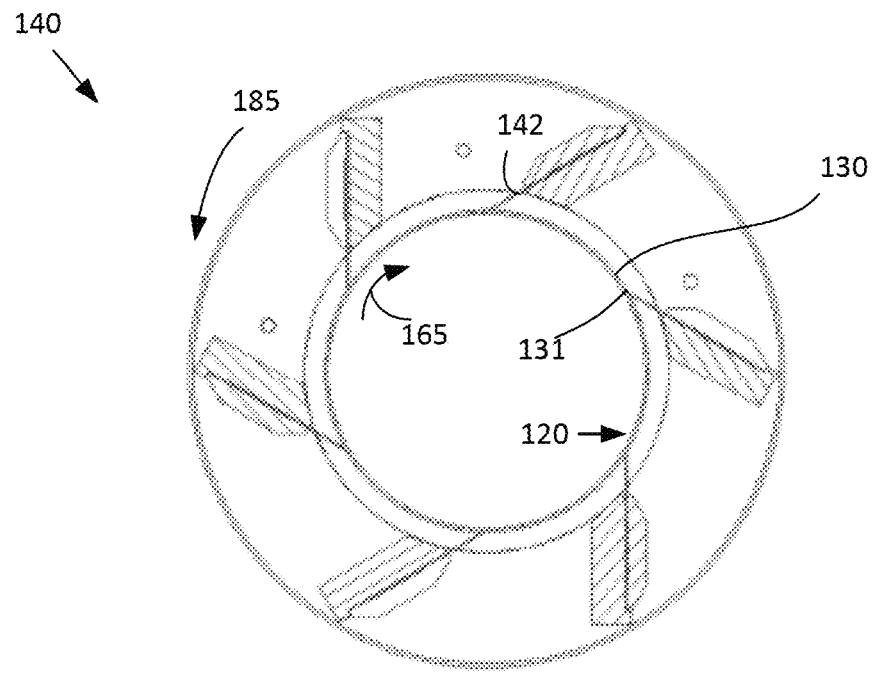
FIG. 8B illustrates an end cut-away view of one embodiment of the rotary shearing mechanism.

FIGS. 8A and 8B illustrate end views of rotary shearing mechanism 140. Blades 142 are disposed in an angular orientation relative the outer surface 130 of central drum 120. More specifically, FIG. 8A illustrates normal line 109 that is perpendicular to longitudinal axis 101. The orientation of a first blade 142a, is such that first blade 142 is disposed at a non-parallel angle to normal line 109. As shown in FIG. 8B this disposes blades 142 at an angular relationship to central drum 120. In operation, rotary sharing mechanism is rotated in second direction 185 and central drum is counter-rotated in first direction 165. In this regard, first edge 147 of blades 142 intersects central drum 120 at an angle.

Though illustrated in FIGS. 1-8B as utilizing steel blades, other cutting elements are possible and considered within the scope of the present disclosure. For example, chassis of the shearing mechanism may utilize taut wires that extend between first end support and second end support as a cutting element, as variously illustrated in the embodiment of FIGS. 9A-12. In this embodiment, chassis can support the wires about the outer surface of central drum such that these wires extending parallel or helically about the longitudinal axis of the central drum. In operation, when rotary shearing mechanism 140 is rotated about central drum 120, the wires trim/cut plant material/buds extending through the slots.

Figure 9A:
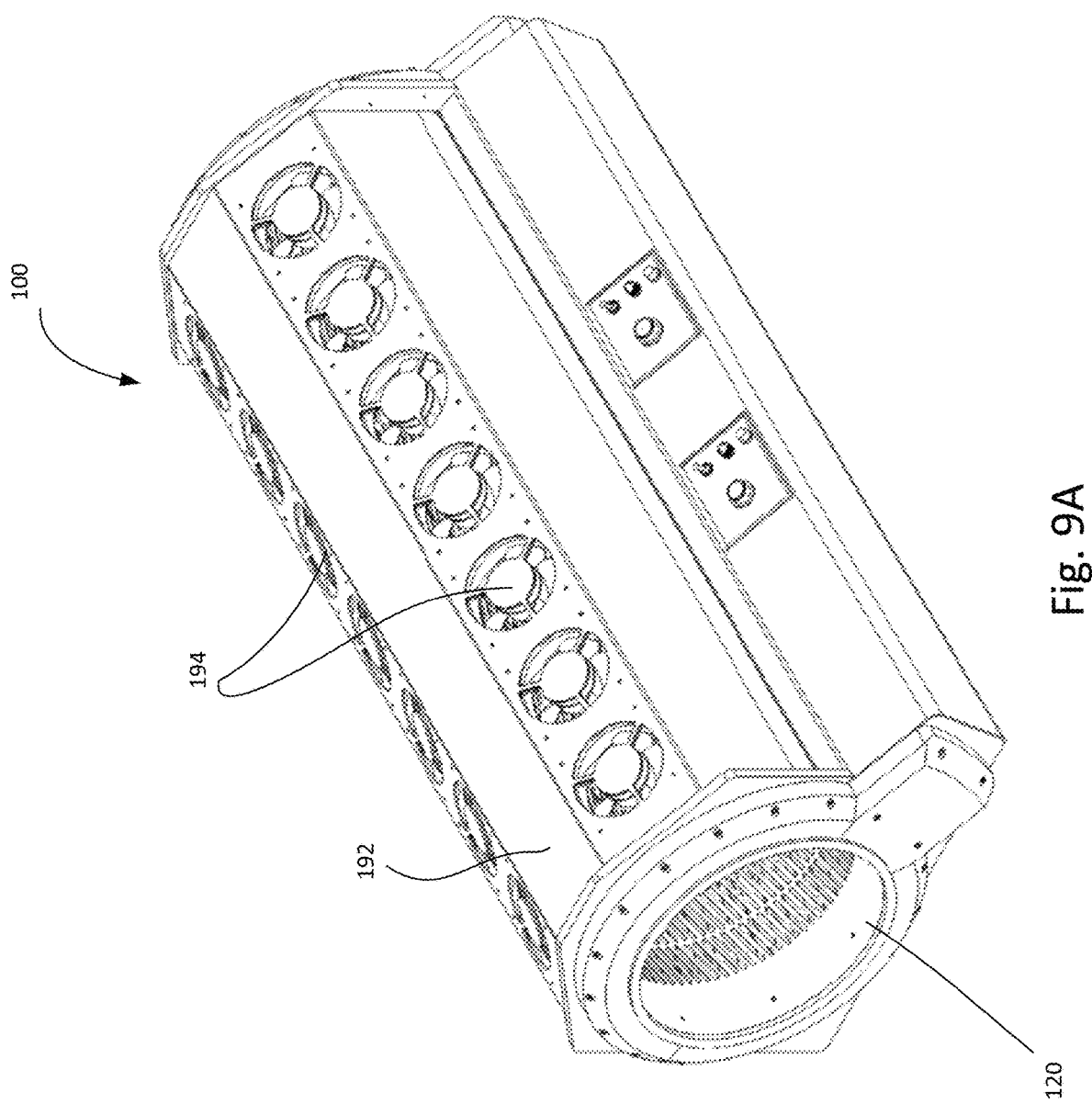
FIG. 9A and 9B illustrate a second embodiment of a plant processing apparatus.
Figure 9B:
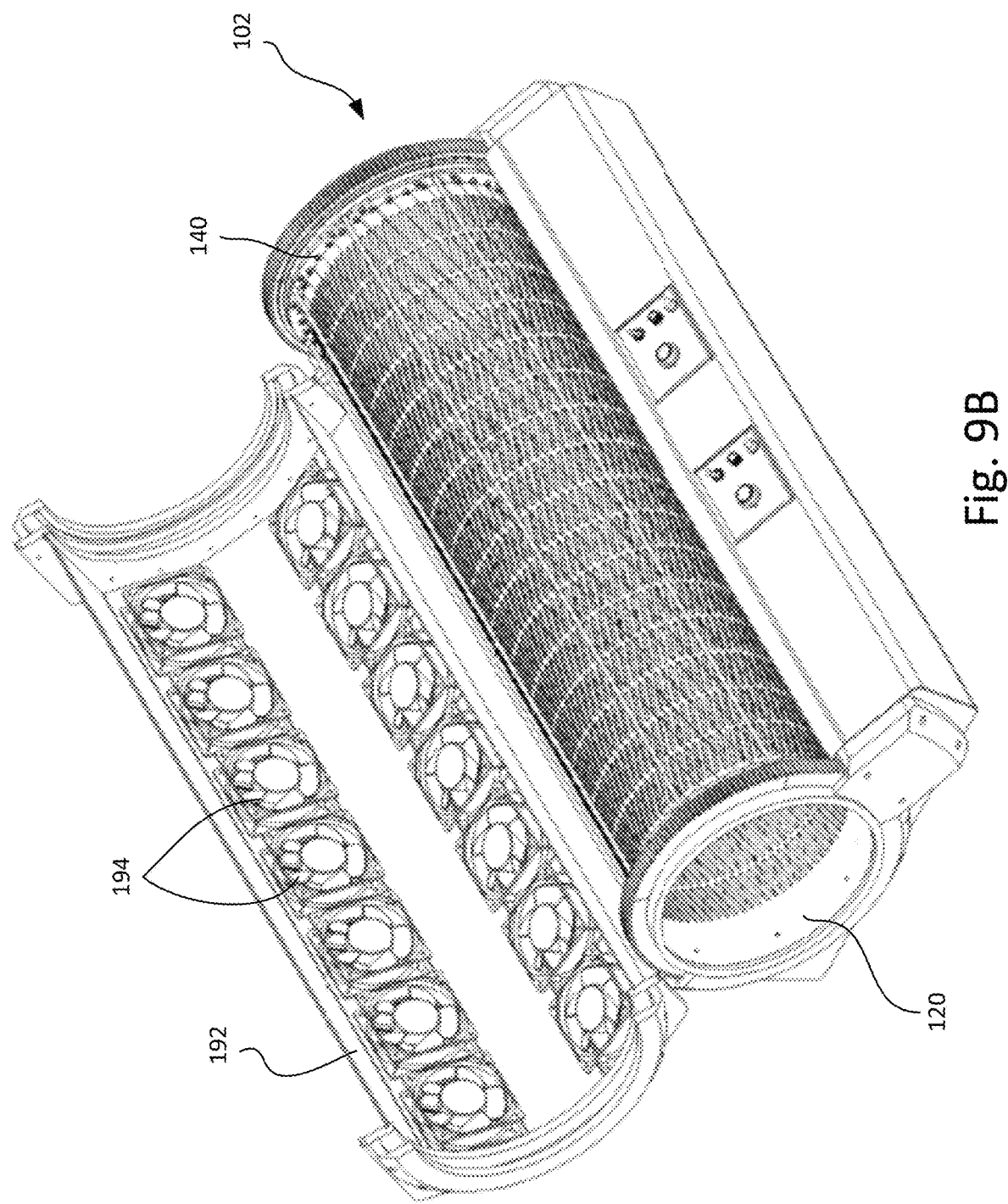

As illustrated in FIGS. 9A and 9B, the taut wire embodiment of the plant trimming apparatus 10 does not include a stand. However, it will be appreciated that the apparatus 100 may include such a stand. As shown, this embodiment of the plant trimming apparatus 100 includes a shroud or hood 192 that surrounds the rotary trimming apparatus 102. More specifically, the hood extends over the top half of the central drum 120 and the co-axial shearing mechanism 140. As discussed above in relation to the previous embodiment, the plant trimming apparatus 100 may further include a vacuum manifold that may draw air through the central drum 120 to draw plant matter (e.g., leaves) through the slots of the drum 124 for trimming. In the illustrated embodiment, the hood 192 includes a plurality of fans 194. These fans provide airflow (e.g., positive air pressure) through the slotted central drum 120 to assist in the disposition of plant matter through the slots of the central drum 120.

Figure 10:
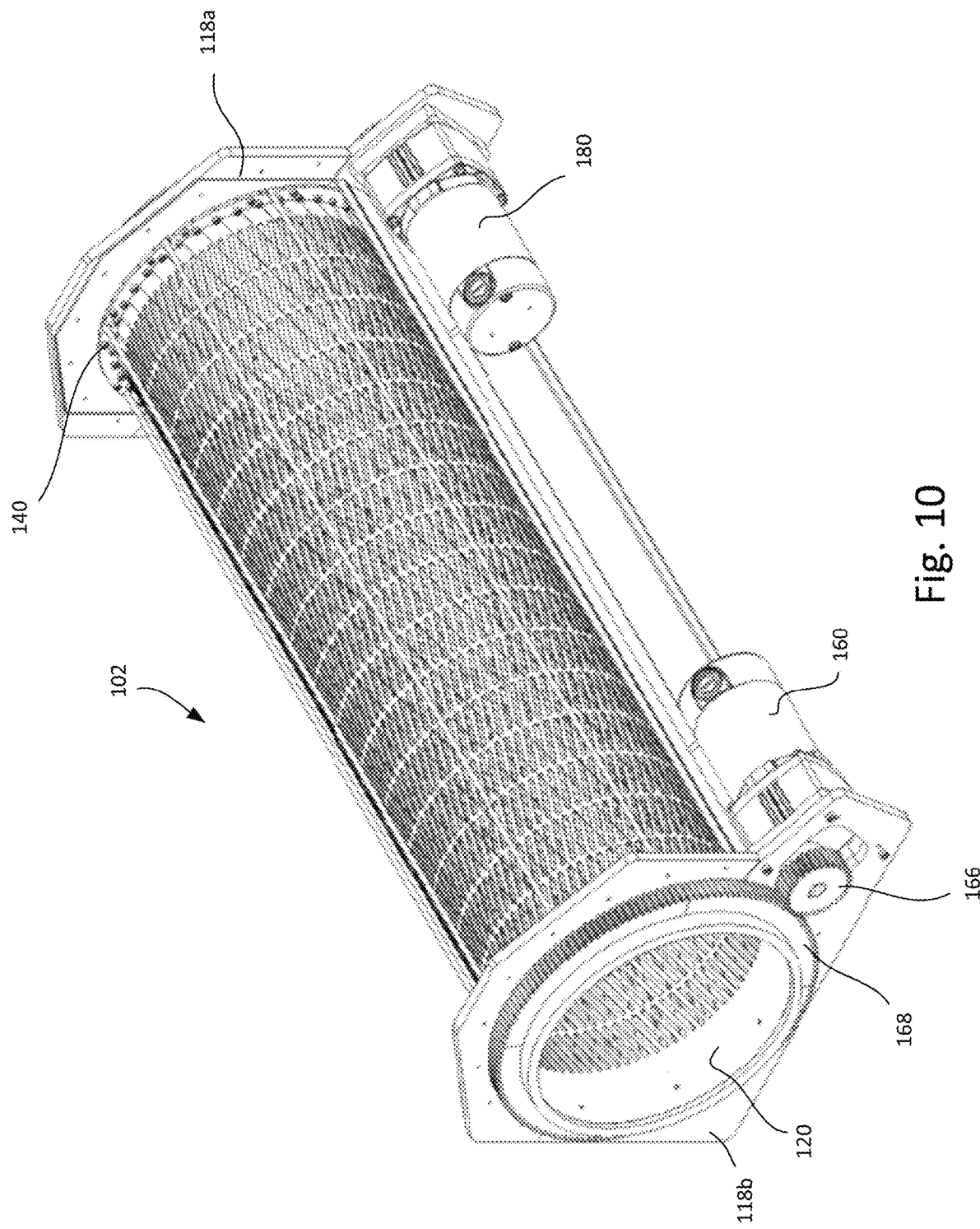
FIG. 10 illustrates a rotary trimming device of the second embodiment.

FIG. 10 illustrates the rotary trimming apparatus 102. As shown, the rotary trimming apparatus includes the generally cylindrical central drum 120, which is rotated about is longitudinal axis by drum drive 160. Disposed coaxially about the central drum, is the coaxial rotary shearing mechanism 140, which is rotated in an opposite direction (e.g., counter-rotated) by shearing drive 180. In this embodiment, the drum drive 160 and the sharing drive 180 utilize a gearing arrangement to counter rotate the central drum and the shearing mechanism. In this regard, the drum drive 160 includes an electric motor that drives drive gear 166, which is enmeshed with an annular drum gear 168 connected about the outer periphery on a first end of the central drum 120. Likewise, the sharing drive 180 also includes a drive gear (not shown) that meshes with an annular gear 170 disposed on a first end of the chassis 141 of the shearing mechanism 140. See e.g., FIG. 11A. In the embodiment of FIG. 10, the drum drive and shearing drive are connected to end plates 118a and 118b. These end plates include various apertures to allow for mounting the shearing mechanism to a stand and/or attaching various hoods and/or shrouds to the device.

Figure 11A:
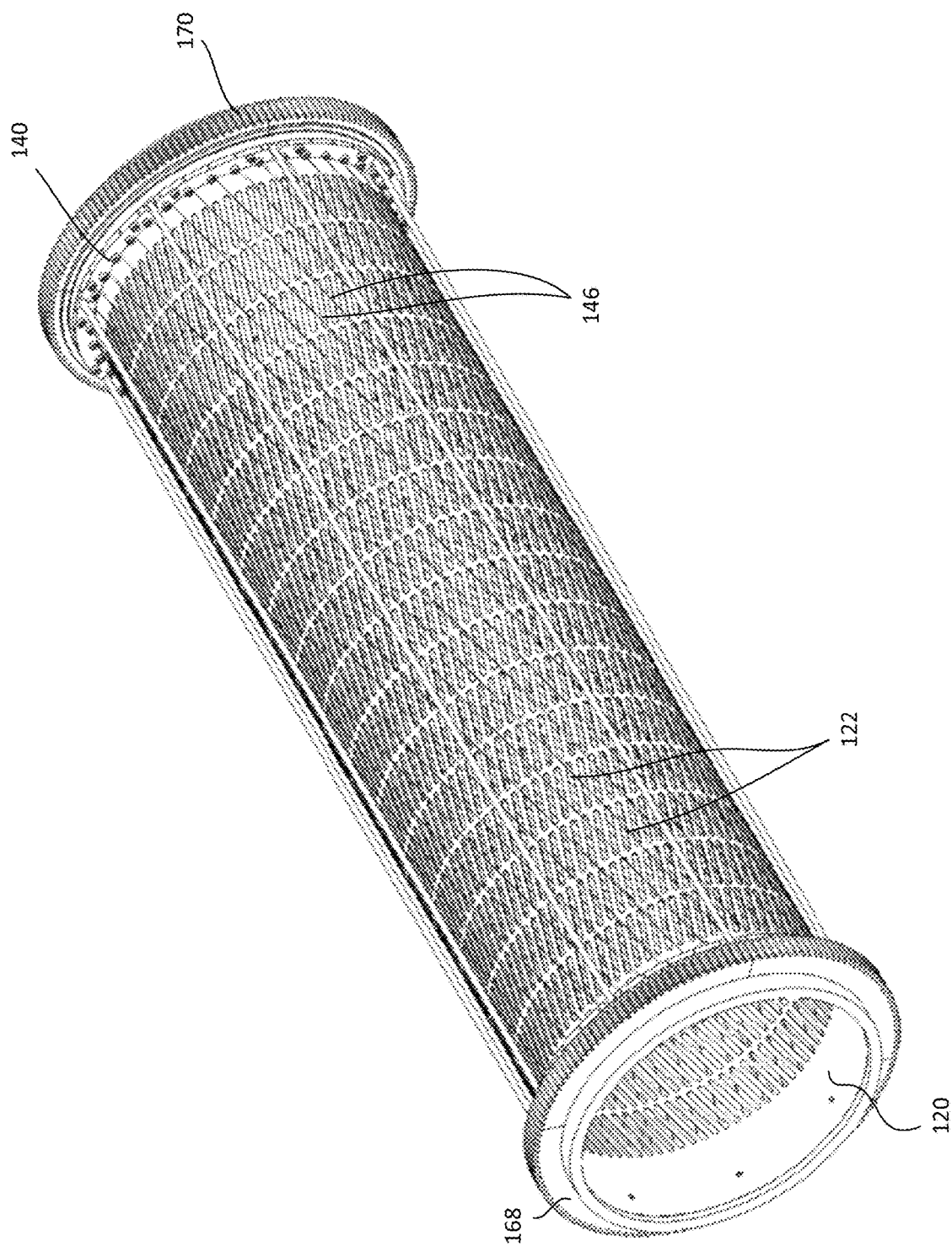
FIGS. 11A, 11B and 11C illustrate the central drum and shearing mechanism in a coaxial assembled configuration, the central drum, and the shearing mechanism, respectively, of the second embodiment.
Figure 11B:
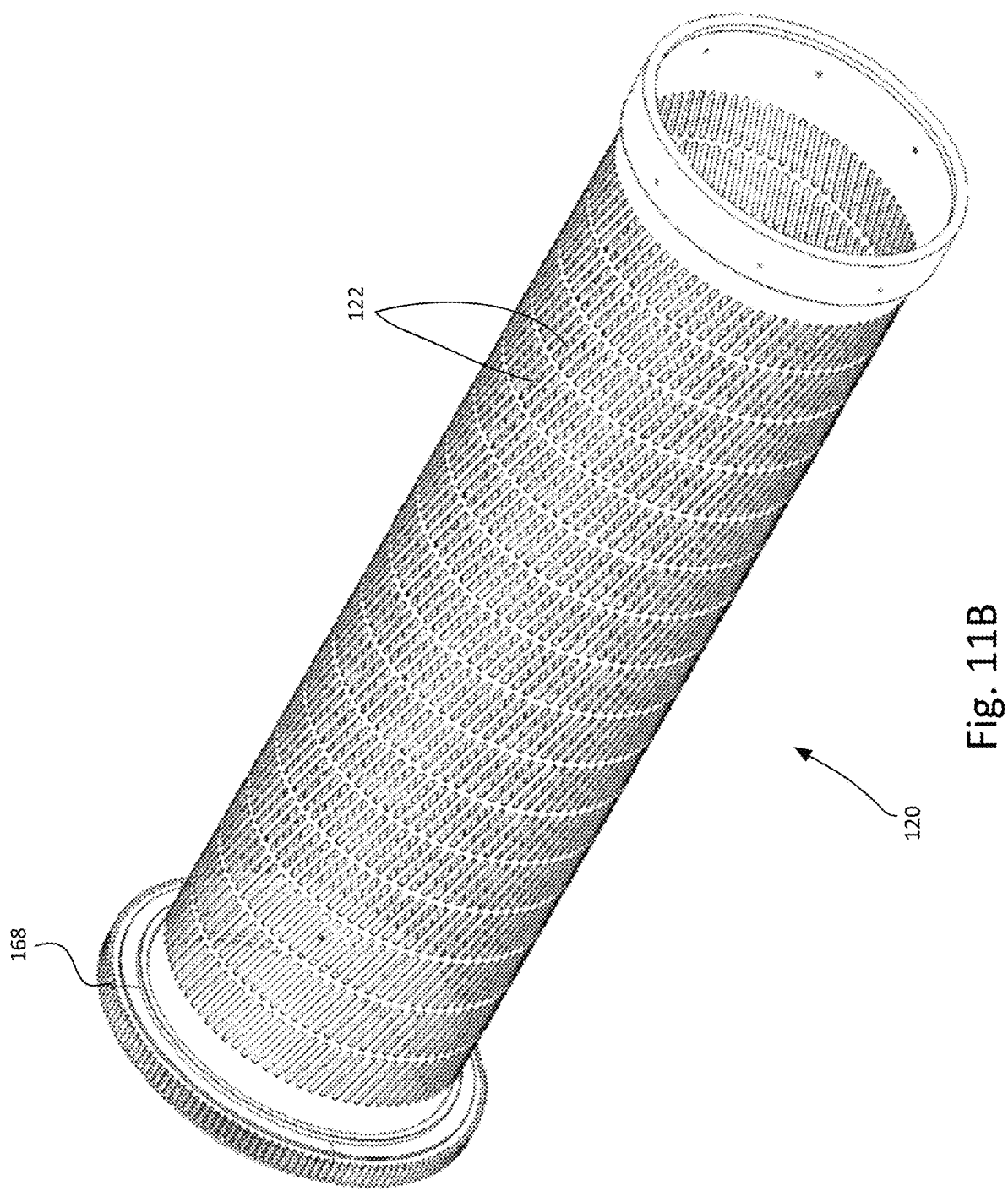
Figure 11C:
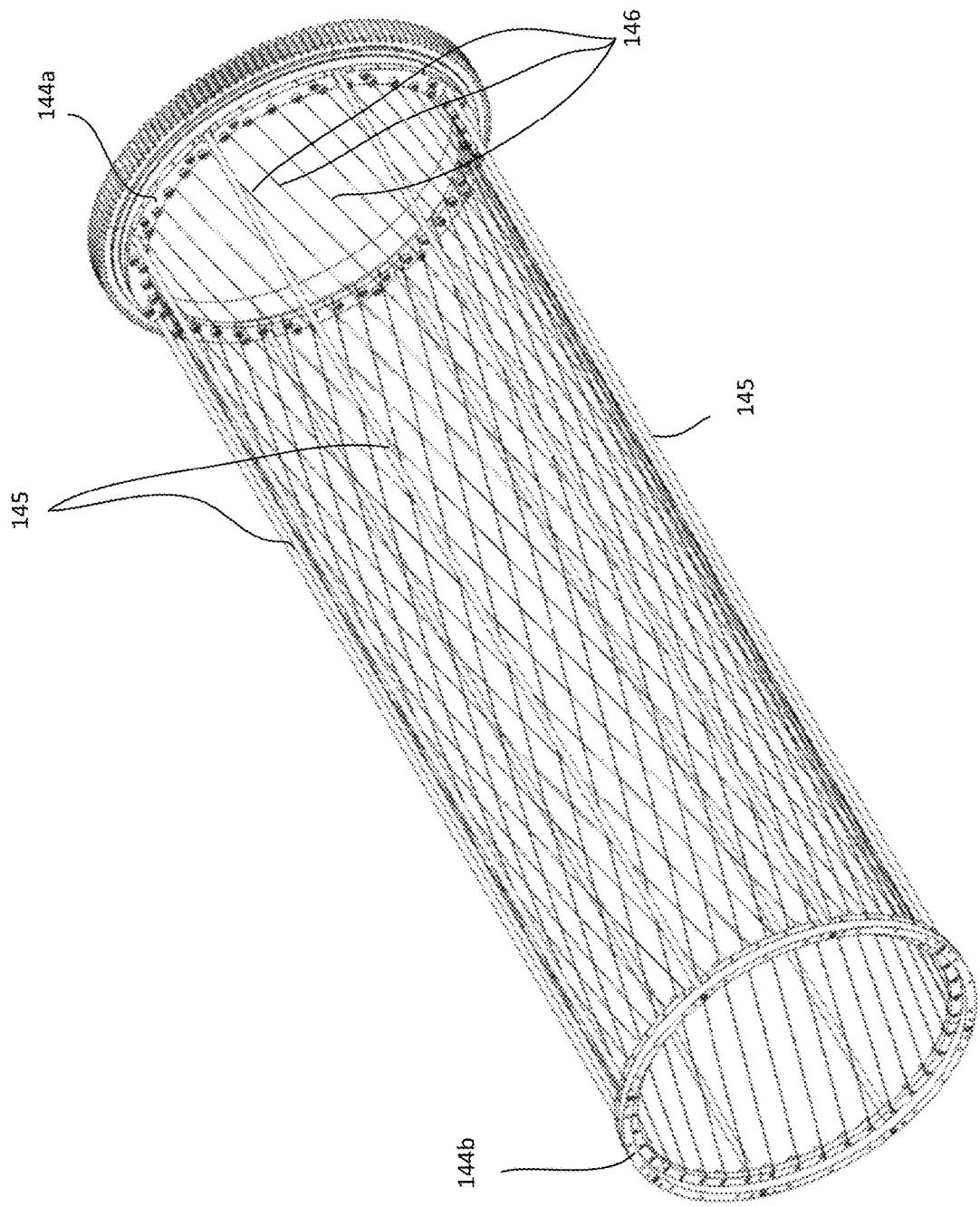

FIGS. 11A-11C illustrate the central drum and shearing mechanism in a coaxial assembled configuration, the central drum and the shearing mechanism, respectively. As shown in FIG. 11A, when the central drum 120 and the shearing mechanism 140 are coaxially disposed, taut wires 146, which extend between annular end supports of the shearing mechanism 140, are disposed on the outside surface of the central drum 120. These taut wires 146 pass over the slots 122 in the central drum 120 thereby trimming any material that extends though the side wall of the drum 120. FIG. 11B illustrates an embodiment of the central drum 120. With the exception of the annular drum gear disposed on a first end of the drum, the drum is substantially identical to the drum described in FIGS. 5A-5C above where a plurality of slots 122 are disposed in columns around the drum and along the longitudinal axis of the drum. Each slot 122 slot may disposed in a non-parallel relationship to longitudinal axis of the drum. However, this is not a requirement.

Figure 12:
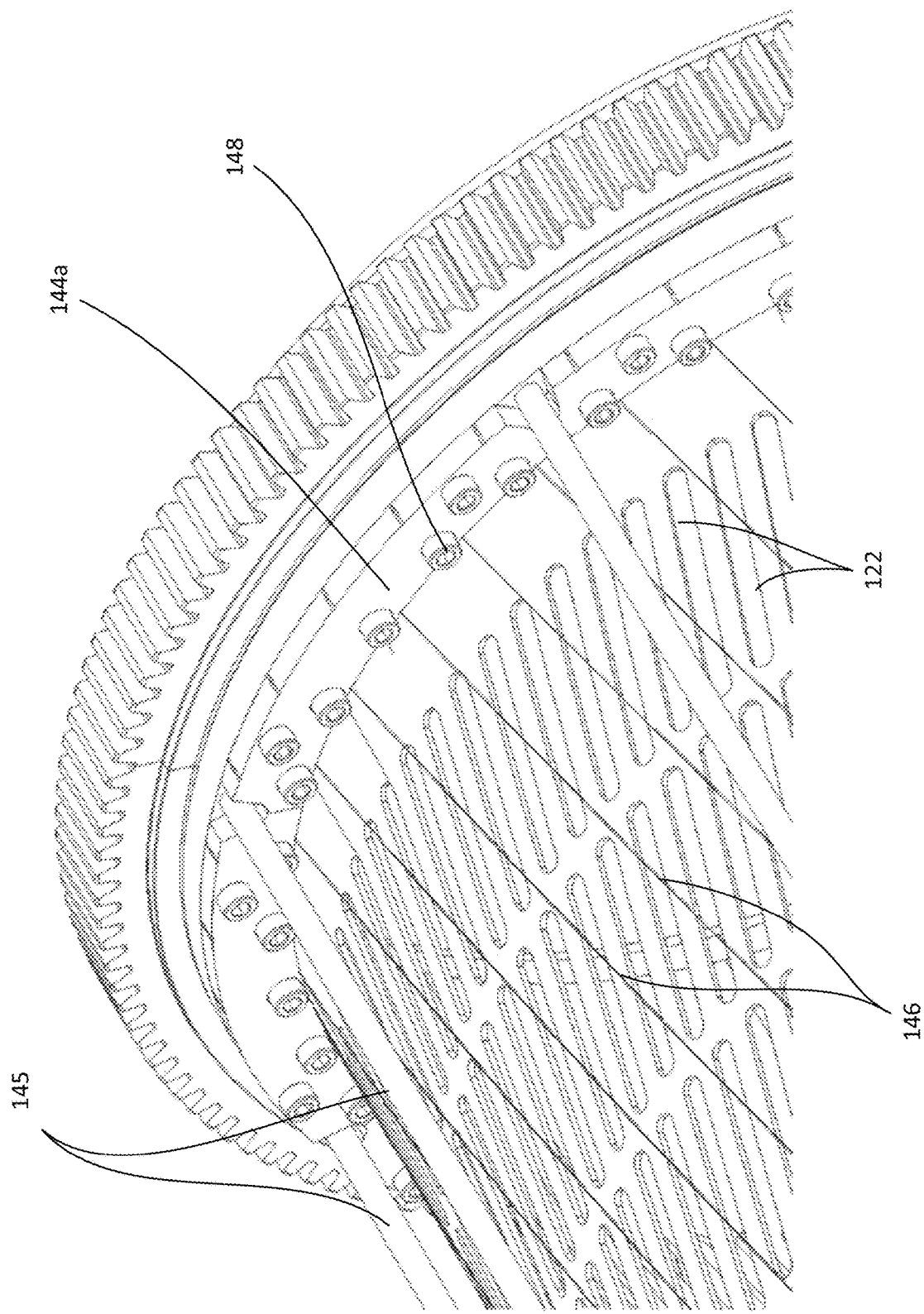
FIG. 12 illustrates a close up of a portion of the shearing mechanism of the second embodiment.

FIGS. 11C and 12 illustrate the taut wire shearing mechanism. As shown, first and second annular end supports 144a, 144b are maintained in a spaced relationship by a plurality of struts 145 that extend there between. The annular end supports and struts generally define a chassis 141. A plurality of wires 146 extend between the two annular supports 144a. 144b. As best shown in FIG. 12, each wire may extend under the inner periphery of the annular end support 144a (e.g., in a recessed channel; not shown). The wire may then be turned (e.g., 90 degrees) to engage a wire tensioner 148. The wire tensioner may be a threaded element having, for example, an aperture in its threaded shaft that receive a wire. By turning the wire tensioner (e.g., in a threaded hole in the annular support 144a), the wire may be tensioned to a desired amount. In the illustrated embodiment, the wires are non-parallel to a central axis of the shearing mechanism. That is, the wires are generally helical about the central axis defined by the annular end supports. Of note, prior to disposition over the central drum, these wires will necessarily extend in a straight line between the annular end supports. Disposition over the central drum results in further tensioning these wires.

In further embodiments (not shown), the struts may additionally or alternatively support various elements that clean or remove material from the outer surface 130 of the central drum 120. In various embodiments, the chassis 141 can dispose and/or bias the wires against central drum 120. In some embodiments, a combination of blades 142 and wires can be used to shear/trim plant buds/material. In other embodiments, struts 145 can include brush(es), squeegee(s), wiper(s), pad(s) and/or the like to scrape, wipe, collect trimmed plant material, sap, resin, oils, etc. from central drum 120. For instance, the struts may support, in addition to supporting one or more blades, one or more pads, scrapers or sponges (e.g., cleaning elements) that move around the outer surface of the central drum while the rotary shearing mechanism 140 rotates. Alternatively, one or more struts may be free of blades and instead support pads, scrapers and/or sponges. For instance, struts may alternate between supporting blades and supporting cleaning elements.

Other aspects and embodiments of the plant trimming apparatus comprise any one or more feature(s) disclosed herein in combination with any one or more other feature(s) or a variant or equivalent thereof. In any of the embodiments described herein, any one or more features may be omitted altogether or replaced or substituted by another feature disclosed herein or a variant or equivalent thereof.

Numerous modifications and changes to the embodiments described above will be apparent to those skilled in the art.

What is claimed is:

1. A plant processing apparatus for trimming plant material, comprising:
   a rotary trimming device comprising:
      a central drum comprising first and second ends and an annular sidewall extending, along a longitudinal axis between the first and second ends, the annular sidewall having a plurality of slots extending between an inner surface and an outer surface; and
      a rotary shearing mechanism comprising a plurality of wires extending from proximate to the first end of the central drum to proximate to the second end of the central drum, wherein the wires are disposed in a helical path around the outer surface of the central drum, wherein at least a first wire is disposed at a first radial orientation relative to the longitudinal axis and at least a wire is disposed at a second radial orientation relative to the longitudinal axis;
   a drum drive interconnected with the central drum, the drum drive configured to rotate the central drum about the longitudinal axis; and
   a shearing drive interconnected with the rotary shearing mechanism, the shearing drive configured to rotate the plurality of wires about the longitudinal axis and around the outer surface of the central drum.

2. The plant processing apparatus of claim 1, wherein at least a portion of the plurality of slots comprise a length extending along a major axis and a width extending along a minor axis, wherein the major axis is disposed in a non-parallel orientation relative to the longitudinal axis.

3. The plant processing apparatus of claim 1, wherein a width of each blade in the plurality of blades is longer than a longitudinal length of at least a portion of the plurality of slots.

4. The plant processing apparatus of claim 1, wherein the drum drive rotates the central drum in a first direction and the shearing drive rotates the rotary shearing mechanism in a second direction.

5. The plant processing apparatus of claim 4, wherein the drum drive is operable to rotate the central drum at a first speed and the shearing drive is operable to rotate the rotary shearing mechanism at a second speed, independent of the first speed.

6. The plant processing apparatus of claim 1, further comprising at least a first nozzle connected to a fluid supply, wherein the first nozzle directs fluid onto at least one of the outer surface of the central drum.

7. The plant processing apparatus of claim 1, further comprising:
   a manifold disposed about the central drum and rotary shearing mechanism; and
   an air source for providing pressurized airflow or negative pressure airflow through the manifold.

8. A rotary trimming device comprising,
   a central drum comprising first and second ends, and an annular sidewall extending between the first and second ends, the annular sidewall having a plurality of slots extending between an inner surface and an outer surface, the plurality of slots each having a closed perimeter, the central drum configured to rotate around a longitudinal axis in at least a first direction; and
   a rotatory shearing mechanism comprising:
      a plurality of wires extending from proximate to the first end of the central drum to proximate to the second end of the central drum, wherein the wires are disposed in a helical path; and
      a chassis coaxially disposed around the outer surface of the central drum, the chassis configured counter-rotate the plurality of wires relative to the central drum, wherein the chassis biases the wires against the outer surface of the central drum.

9. The plant processing apparatus of claim 8, further comprising:
   a manifold disposed about the central drum and rotary shearing mechanism; and
   an air source for providing pressurized airflow or negative pressure airflow through the manifold.

* * * * *